(No Model.)
C. E. HANNA.
COMBINED FEED TROUGH AND HAY RACK.
No. 397,497. Patented Feb. 12, 1889.

Fig. 4 / Fig. 3 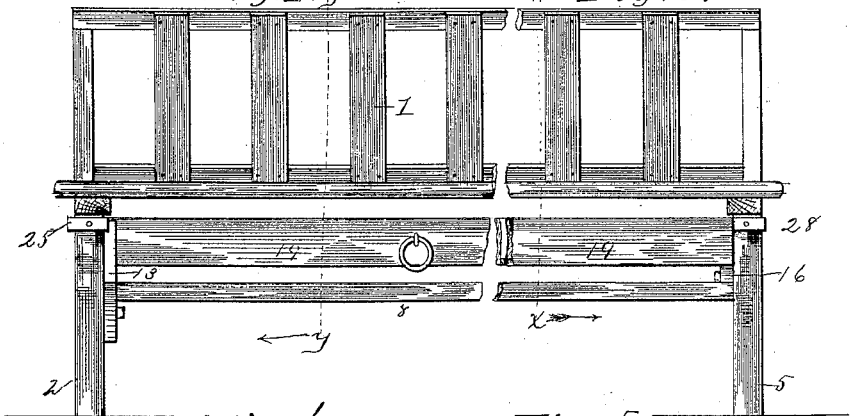

Witnesses:
F. R. Cornwall,
Chas. F. Mallard.

Inventor:
Chas. E. Hanna,
per Stoddart & Co.
Attys.

UNITED STATES PATENT OFFICE.

CHARLES EDWIN HANNA, OF MIDDLEBOURNE, OHIO.

COMBINED FEED-TROUGH AND HAY-RACK.

SPECIFICATION forming part of Letters Patent No. 397,497, dated February 12, 1889.

Application filed September 14, 1888. Serial No. 285,380. (No model.)

*To all whom it may concern:*

Be it known that I, CHARLES EDWIN HANNA, a citizen of the United States, residing at Middlebourne, in the county of Guernsey and State of Ohio, have invented new and useful Improvements in Combined Feed-Trough and Hay-Rack, of which the following is a specification.

My invention has relation to structures from which to feed cattle and horses and sheep, and is in the nature of a combined feed-trough and hay or fodder rack.

It has for its object to furnish a hay-rack, combined with one or more feed-troughs, of such a construction that it will afford the same conveniences as the different structures would if made separate, and at the same time the complete structure will take up no more room than the hay-rack would alone, thus economizing in cost and space.

With these objects in view my invention consists in the improved construction, arrangement, and combination of parts hereinafter fully described, and afterward specifically pointed out in the claims.

Figure 2:
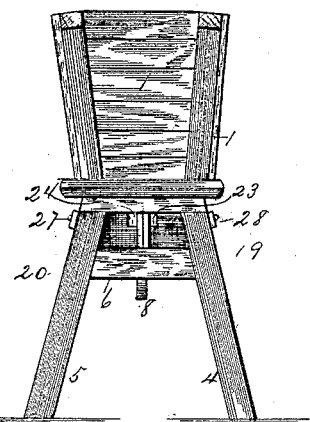
Figure 1:
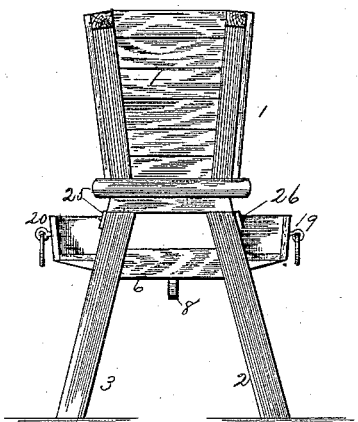
Figure 6:
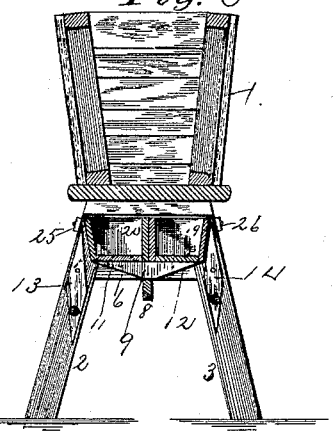
Figure 5:
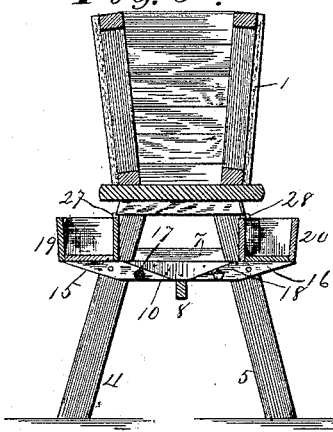
Figure 7:

In the accompanying drawings, Figure 1 is a view showing my combined feed-trough and hay-rack in end elevation, the parts being in the positions they assume when arranged to use the troughs or racks, or both, as desired. Fig. 2 is a view in end elevation of the same parts, the feed-troughs being stowed away under the hay-rack. Fig. 3 is a view in side elevation of a portion of my combined trough and rack, the parts being disposed as in Fig. 1. Fig. 4 is a view similar to Fig. 3, with the parts arranged as in Fig. 2. Fig. 5 is a vertical section on the line $x\ x$ of Fig. 3, looking in the direction of the arrow. Fig. 6 is a vertical section on the line $y\ y$ of Fig. 4, looking in the direction of the spear; and Fig. 7 is an enlarged view, in end elevation, of one of the feed-troughs detached.

Like numerals of reference mark the same parts in all the figures.

Referring to the drawings by numerals of reference, 1 is a hay or fodder rack of an ordinary construction. 2, 3, 4, and 5 are the legs thereof. 6 and 7 are cross-bars connecting the pairs of legs at each end.

8 is a longitudinal bar connecting the cross-bars 6 and 7.

9 and 10 are cleats secured to the inner sides of the cross-bars 6 and 7, respectively, their upper edges being level and their lower edges being beveled off, as shown at 11 and 12.

13, 14, 15, and 16 are buttons pivoted on the inner sides of the legs 2, 3, 4, and 5, having beveled ends 17 and 18, the purposes of which will be hereinafter described.

19 and 20 are feed-troughs of ordinary construction, the ends of each of which are notched (or grooved) at 23 and 24 near their upper rear edges.

25, 26, 27, and 28 are buttons pivoted on the outer sides of the legs.

The operation of my invention may be described as follows: The troughs, being under the rack out of the way, and thereby always clean, as shown in Figs. 2, 4, and 6, rest upon the cleats 9 and 10, the buttons 13, 14, 15, and 16 hang vertically in front of them, and the buttons 25 26 27 28 stand horizontally in front of the vertical buttons. In this position the troughs will be maintained in moving the rack from place to place, or when only the rack is required for use. When, however, it is desired to use one or more of the troughs, the buttons 25 26 27 28 are placed vertically, and the troughs drawn out, which causes the buttons 13 14 15 16 to assume horizontal positions, (see Figs. 1 and 5,) their inner beveled edges coinciding with the lower beveled edges of the cleats 9 and 10, the latter forming stops for the former, thus forming elongations of the cleats 9 and 10, upon which the troughs slide and rest, the troughs being carried to a position in which the buttons 25 26 27 28 are turned into the notches 23 24, firmly securing them against further movement or displacement.

The buttons 13 14 15 16 are heavier at their inner ends, so that they will drop when the troughs are pushed in, and the upper ends are beveled to cause the buttons 25 26 27 28 to pass down the outer sides when in that position.

As many troughs as desired may be used with a single rack.

Having thus fully described my invention, what I claim as new, and desire to secure by Letters Patent of the United States, is—

1. In combination, the rack, the cleats and buttons having coinciding beveled edges attached to the inner sides of the legs of the rack, the sliding troughs having notches in their edges, and the buttons to engage said notches, as set forth.

2. In combination, the rack, the cleats secured to its legs and having lower beveled edges, the buttons with ends oppositely beveled and of unequal weight—the inner the heavier—the troughs having notches in their ends, and the buttons pivoted to the front of the legs in position to engage the notches or the upper beveled ends of the other buttons, as desired.

In testimony whereof I affix my signature in presence of two witnesses.

CHARLES EDWIN HANNA.

Witnesses:
    DAVID R. HUMPHREY,
    ISAAC W. GLEAVES.